United States Patent
Grundvig et al.

(10) Patent No.: US 6,266,780 B1
(45) Date of Patent: Jul. 24, 2001

(54) GLITCHLESS CLOCK SWITCH

(75) Inventors: Jeffrey Paul Grundvig, Macungie; Wenzhe Luo, Allentown; Zhigang Ma, Bethlehem; Brian John Petryna, Lebanon, all of PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/219,799

(22) Filed: Dec. 23, 1998

(51) Int. Cl.[7] ........................................................ G06F 1/12
(52) U.S. Cl. ............................................. 713/501; 713/400
(58) Field of Search ..................................... 713/322, 500, 713/501, 400

(56) References Cited

U.S. PATENT DOCUMENTS

| | | | |
|---|---|---|---|
| 5,561,288 | * 10/1996 | Stevens | 250/214 C |
| 5,577,075 | * 11/1996 | Cotton et al. | 375/356 |
| 5,604,754 | * 2/1997 | Itskin et al. | 714/798 |
| 5,652,536 | * 7/1997 | Nookala et al. | 327/298 |
| 5,848,281 | * 12/1998 | Smalley et al. | 213/322 |
| 6,163,583 | * 12/2000 | Lin et al. | 375/354 |

* cited by examiner

Primary Examiner—Thomas M. Heckler
(74) Attorney, Agent, or Firm—William H. Bollman

(57) ABSTRACT

A glitchless clock switch in accordance with the principles of the present invention avoids the need to directly synchronize clock selection signals with the source clock. Instead, clock switching control signals are generated with relation to Finite-State-Machines (FSMs) for each clock signal. Thus, the cycle relationship of the different clock sources do not affect the clock switching process. The FSM for each clock has three states: ON, STOP, and IDLE. During the switching process, each clock signal enters its respective IDLE state. Detection of the ALL_IDLE state is synchronized with a directly derived signal from the newly selected clock. Any glitches in the switching process are isolated to the control of the synchronization of the ALL_IDLE state, which does not affect the output clock signal.

10 Claims, 2 Drawing Sheets clk0 - FSM0 clk1 - FSM1 clk2 - FSM2

3-CLOCK SWITCH DESIGN WITH FSM METHOD

GLITCHLESS CLOCK SWITCH

BACKGROUND OF THE INVENTION

1. Field of the Invention

This invention relates generally to the switching between multiple clock signals. More particularly, it relates to the smooth, glitchless switching between two or more clock signals for use by sensitive circuitry such as a microprocessor, microcontroller, or digital signal processor.

2. Background of Related Art

Power management of a digital processing system is important, especially in today's world where miniaturization is realized with smaller batteries, smaller heat sinks, etc.

It is well known that in general, faster operation of a particular digital circuit requires more power than if the same digital circuit were to be operated at a slower speed. Thus, one technique for managing the power of a particular processing system is to vary the system clock speed depending upon the current needs of the system. A faster system clock may be used during times that a maximum amount of processing capability takes precedence over power consumption. Inversely, a slower system clock may be used during periods of low activity in an effort to conserve power resources.

It is common in power management techniques to provide a plurality of accurate clock sources generated, e.g., from separate crystals. The separate clock sources are typically separate and asynchronous from one another.

To place a particular processing system in a low power mode, a slower system clock signal is typically switched in. Similarly, to enter a higher power mode, the slower clock signal is switched out and a faster clock signal is switched in as a new system clock signal.

In order to swap the system clock from high speed to low speed, or from low speed to high speed, assurance must be provided that a clock 'spike' or 'glitch' does not occur in the system clock. A glitch corresponds to a frequency of the system clock which is faster than the desired or required clock frequency. A glitch in the system clock raises the possibility that the digital processing system utilizing the system clock may malfunction.

Clock switching control signals are typically synchronized with a current system clock (i.e., a clock source currently in use as the system clock signal), particularly if generated by the digital processing system itself. Thus, because the available clock sources are typically mutually asynchronous with one another, clock switching control signals are typically asynchronous with the "future" system clock (i.e., generated by the clock source being switched to).

Thus, a synchronizer is typically used in the generation of clock switching control signals. Synchronizers generally provide that the clock switching control signals first turn off the current system clock, and then turn on the future system clock.

Accordingly, because a conventional synchronizer is used to synchronize clock switching control signals directly, the synchronization process becomes complex and unreliable. This is especially true in the case of a transition between a very fast system clock signal and a very slow system clock signal.

The design of a glitchless clock switch using a synchronizer requires a significant amount of effort to ensure a proper timing relationship for the clock switching control signals, e.g., mutual-locking logic. Some clock sources (e.g. a fast PLL clock source) may require the use of auxiliary clock signals (such as the internal clock signal from the PLL) to assist in ensuring a smooth transition in the clock switching process. Thus, clock switching circuit design is typically customized for the particular application, leading to increased expense in each new design, and lower reliability from design to design due to the increased complexity of the clock switching circuitry and because each clock switching circuit is newly designed.

Accordingly, there is a need for a glitchless clock switching technique which is reliable, simple, and/or reusable from design to design.

SUMMARY OF THE INVENTION

In accordance with one aspect of the principles of the present invention, a finite state machine for a glitchless clock switch comprises an on state, a stop state, and an idle state.

A glitchless clock switch in accordance with another aspect of the present invention comprises a plurality of clock signals each being adapted to have three states of operation. Logic is adapted to detect when all of the plurality of clock signals are simultaneously in one of the three states of operation, and to activate a corresponding all-idle signal. The all-idle signal is synchronized to a newly selected clock signal when switching from one of the plurality of clock signals to another of the plurality of clock signals.

A method of switching between a plurality of clock signals in accordance with yet another aspect of the present invention comprises transitioning all of the plurality of clock signals into a respective IDLE state. The respective IDLE states of all of the plurality of clock signals are synchronized to a selected one of the plurality of clock signals. The selected one of the plurality of clock signals is output once the respective IDLE states of all of the plurality of clock signals are synchronized by the step of synchronizing.

BRIEF DESCRIPTION OF THE DRAWINGS

Features and advantages of the present invention will become apparent to those skilled in the art from the following description with reference to the drawing, in which.

DETAILED DESCRIPTION OF ILLUSTRATIVE EMBODIMENTS

The present invention provides a reliable and generic technique for the design of a glitchless clock switch. A glitchless clock switch in accordance with the principles of the present invention avoids the need to directly synchronize clock selection signals with the source clock. Instead, clock switching control signals are generated with relation to Finite-State-Machines (FSMs) for each clock signal.

In accordance with the principles of the present invention, synchronization of clock switching control signals is clear and indirectly and independently derived with respect to the current and future clock signals. For instance, the cycle relationship of the different clock sources, i.e., the current and future clock signal sources, does not affect the clock switching process.

Moreover, in accordance with the principles of the present invention, a glitchless clock signal switching circuit does not require the use of any auxiliary clocks other than the source clocks themselves.

The principles of the present invention relate to the switching between a plurality of clock signals, i.e., at least two, and are equally usable with clock switching between only two or between many, many clock signal sources. Thus, the present invention becomes even more advantageous when switching larger numbers of clock signals as compared to conventional synchronizing or other older clock switching techniques.

Figure 1A:
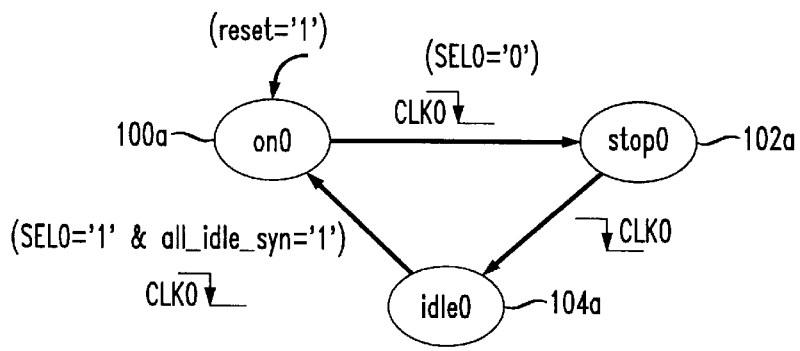
FIGS. 1(a) to (c) show the Finite-State-Machines corresponding to each of the available clock signals switched by a glitchless clock signal switch, in accordance with the principles of the present invention.
Figure 1B:
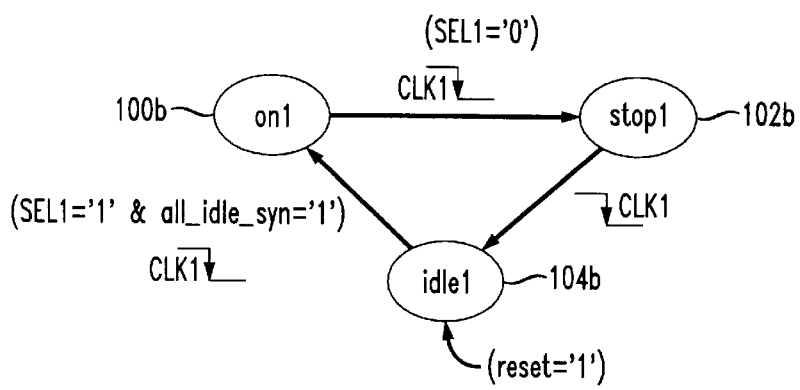
Figure 1C:
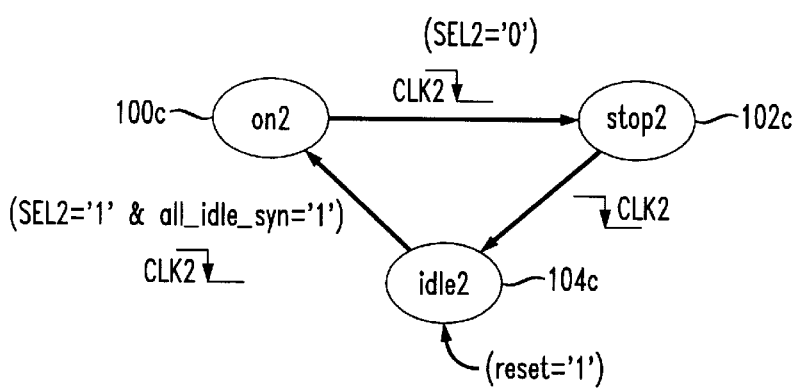

FIGS. 1(a) to 1(c) show the Finite-State-Machines corresponding to each of the available clock signals switched by a glitchless clock signal switch, in accordance with the principles of the present invention.

In particular, FIGS. 1(a) to 1(c) respectively show Finite-State-Machine (FSM) models for each clock signal being switched in the glitchless clock signal switch constructed in accordance with the principles of the present invention. Although the embodiment described with reference to FIGS. 1(a)–1(c) and 2 show a glitchless clock switch for switching between three clock signals, the principles of the present invention relate equally to the switching of, e.g., only two clock signals or, e.g., as many as three, six, twelve, or even more clock signals.

In accordance with the principles of the present invention, each of the clock signals have an associated FSM therefor. Thus, for instance, the FSM shown in FIG. 1(a) is associated with a first clock signal CLK0, the FSM shown in FIG. 1(b) is associated with a second clock signal CLK1, and the FSM shown in FIG. 1(c) is associated with a third clock signal CLK2. Any additional clock signals being switched by a glitchless clock signal switch in accordance with the principles of the present invention would have an FSM similar to that shown in FIG. 1(c) but corresponding to that additional clock signal.

Each FSM 120, 122, 124 has three states: an ON state 100, a STOP state 102, and an IDLE state 104. Moreover, each FSM 120, 122, 124 transitions under the control of the clock signal which it services, e.g., CLK0, CLK1, CLK2, respectively, as shown in FIGS. 1(a), 1(b) and 1(c), respectively.

In its ON state 100, the clock signal serviced by the particular FSM 120, 122 or 124 is currently serving as the chosen clock signal by the glitchless clock switch. Only one clock signal will be in an ON state 100 at any one time.

In its IDLE state 104, the clock signal serviced by the particular FSM 120, 122 or 124 is currently not selected or not in use by the glitchless clock switch.

The STOP state 102 is a transitional state between the ON state 100 and the IDLE state 104 for each respective FSM.

Basically, as shown in FIGS. 1(a) to 1(c), each clock source CLK0, CLK1, CLK2 operates or moves between states 100, 102, 104 of the respective FSM with its falling edge.

Upon reset, all FSMs (e.g., 122 and 124) with the exception of the FSM corresponding to the default clock signal, e.g., FSM 120 corresponding to the default clock signal CLK0, enter into their respective IDLE states 104, while the FSM of the default clock signal, e.g., FSM 120, enters into its ON state 100. In this way, a default working clock signal is provided by circuit logic when the system comes up out of a reset condition. Thus, upon reset, the glitchless clock switch outputs the default clock signal CLK0.

Figure 2:
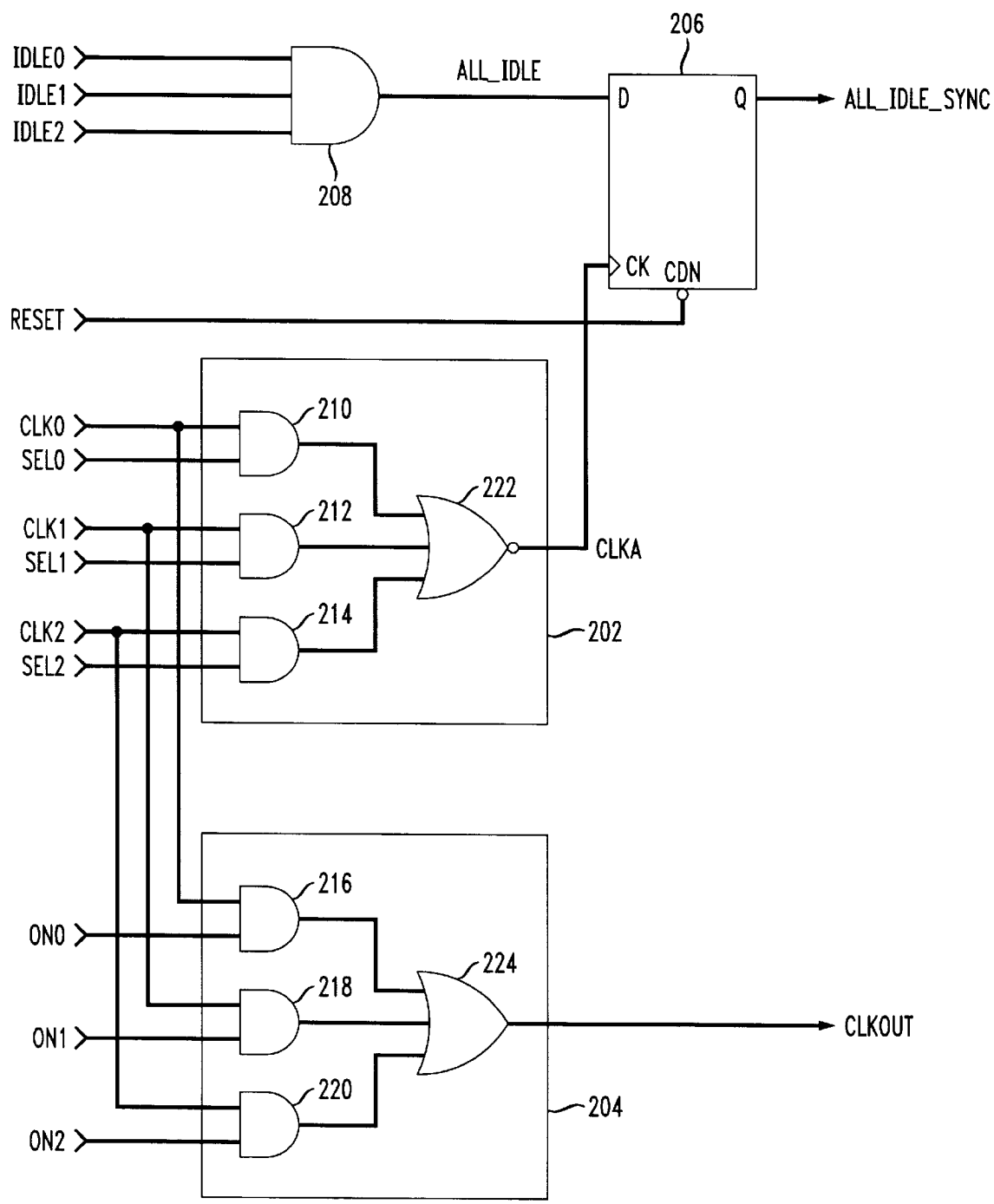
FIG. 2 shows logic implementing the synchronization of an all-idle signal indicating that all available clock signals are in an IDLE state, in accordance with the principles of the present invention.

In accordance with the principles of the present invention, when switching between clock signals CLK0, CLK1 or CLK2, all clock signals enter their respective IDLE states 104 until synchronization is obtained based on the current clock signal, as shown in FIG. 2.

In particular, FIG. 2 shows generation of the ALL_IDLE_SYNC indicating that the FSMs 120, 122, 124 corresponding to all available clock signals CLK0, CLK1, CLK2 are in their respective IDLE state 104. In the disclosed embodiment, the state of individual IDLE signals IDLE0, IDLE1, IDLE2 are ANDed together in an AND gate 208, and synchronized by a D type Flip-Flop (DFF) 206. The DFF 206 outputs an active ALL_IDLE_SYNC signal indicating that all clock signals CLK0, CLK1, CLK2 are idle based on a clock edge of a combinatorial clock signal CLKA.

The combinatorial clock signal CLKA is generated with a NORing of the results of individually ANDed clock signals CLK0, CLK1, CLK2 with their respective selection signal SEL0, SEL1, SEL2 in AND gates 210, 212, 214. The NORing is performed by a NOR gate 222.

Accordingly, the ALL_IDLE_SYNC signal is not activated until an edge (e.g., the falling edge) of the future clock signal (i.e., the one being changed to) occurs.

The output clock signal from the glitchless clock switch is provided by the ORed combination of a signal indicating that one clock signal ON0, ON1, ON2 is in an ON state 100, generated by AND gates 216, 218, 220.

Thus, utilizing a FSM for each clock signal being switched, an indirect, reliable, portable and simple clock switch is provided which is glitchless, greatly reducing or eliminating the possibility of a malfunction in a digital processing system driven by the clock signal selected by the glitchless clock signal switch.

As an example, assume that the currently selected clock is CLK0. At this point, the first FSM 120 is in its ON state 100a, and the second and third FSMs 122, 124 are in their respective IDLE states 104b, 104c. Thereafter, a clock switching command is issued (e.g., by the digital processing system) to switch to another clock signal, e.g., to CLK1. With this clock switching command, clock selection signals in the glitchless clock switch become set as: SEL0='0', SEL1='1', SEL2='0' as shown in FIG. 2. Thus, at this point, the first and third clock signals CLK0 and CLK2 are unselected, while the second clock signal CLK1 is selected.

First, with the first clock selection signal SEL0='0' and upon the falling edge of the first clock signal CLK0, the first FSM 120 will transition from its ON state 100a to its STOP state 102a.

In accordance with the principles of the present invention, the selection signals SEL0, SEL1, SEL2 (and only the clock selection signals) are synchronized with current system clock, e.g., CLK0 in this example, the transition of the first FSM 120 to its STOP state 102a occurs in a single clock cycle of its own clock.

Then, for the next clock cycle, the first FSM 120 automatically transitions to its IDLE state 104a from its STOP state 102a. As shown in FIG. 2, the respective clock sources CLK0, CLK1, CLK2 are switched off when their respective FSMs 120, 122, 124 are not in their respective ON states 100.

Note that the clock switching signal, i.e., SELL need merely be chosen, and the 'synchronization' of the selected clock signal is handled automatically by the logic implementing each of the respective FSMs 120, 122, 124, outputting the selected clock signal, e.g., CLK1, at an appropriate time after selection: without causing glitches in the output clock signal CLKOUT in the process.

Note also that, although in the given example the second clock signal CLK1 was chosen with activation of the SEL1 clock selection line, the FSM 122 corresponding to the second clock signal CLK1 does not immediately change. In fact, in accordance with the principles of the present invention, the second FSM 122 stays in its IDLE state 104b until all FSMs 120, 122, 124 report that they are each in their respective IDLE states 104, indicated by an activation of the ALL_IDLE_SYNC signal, e.g., when the ALL_IDLE_SYNC='1'. Thus, the ALL_IDLE_SYNC signal serves as a locking mechanism to prevent glitches in the switched clock signal, preventing the output of any clock signal until all FSMs 120, 122, 124 are simultaneously in their respective IDLE states 104 wherein no clock signal is output. Only once the ALL_IDLE_SYNC='1' can any FSM (e.g., the FSM 122 corresponding to the selected second clock signal CLK1) transition to its ON state 100.

As shown in FIG. 2, the ALL_IDLE signal output from the AND gate 208 becomes high when all of the FSMs 120, 122, 124 enter their respective IDLE states 104. Then, the ALL_IDLE signal is synchronized by a synchronizer 206 with the direct combinatorial clock signal CLKA.

Note that the combinatorial clock signal CLKA may contain glitches during the transition process from one clock signal to another clock signal. However, these potential glitches do not affect the operation of the synchronizer 206.

When the activated ALL_IDLE signal is captured in the synchronizer 206, the combinatorial clock signal CLKA is synchronized with the newly selected clock signal CLK1, and so the ALL_IDLE_SYNC signal is also synchronized with the newly selected clock signal CLK1.

Once the synchronized ALL_IDLE_SYNC signal is activated, the FSM 122 of the selected clock signal CLK1 transitions to its ON state 100b, making the selected clock signal CLK1 the newly output clock signal CLKOUT, and the glitchless clock switching process is completed.

Note that during the entire exemplary clock switching process, the FSM 124 of the never-selected third clock signal CLK2 remains in its IDLE state 104c. Therefore, to conserve even more power, the never-selected third clock signal, e.g., clock signal CLK2, may be shut off, halted, or otherwise paused from activity.

The principles of the present invention are shown in FIGS. 1(a) to 2. An exemplary circuit for a glitchless clock switch design implementing FSMs 120, 122, 124 is described herein in APPENDIX A through APPENDIX D using an exemplary embodiment of VHDL language code.

VHDL is a hardware description language commonly used in hardware design. The language provides a portable design which can be utilized from product to product. VHDL is equivalent to schematics, which can be generated by a person of skill in the art given the VHDL language and a suitable application program, e.g., SYNOPSISTM.

The exemplary VHDL code includes four VHDL files entitled "KSWITCHn.vhd" (the main file), "KstateFF_s.vhd" (forming the default FSMO), "KstateFF_r.vhd" (forming the non-default, additional clock source FSMi, where i=1, 2 . . . ), and a short package file "pkg_klock.vhd", which defines the three states for the clock FSMs. The exemplary VHDL code describes directly synthesizable hardware which may be implemented for any number of clock sources.

The result of the VHDL synthesis (and the embodiment shown in FIG. 2) shows the use of a D-type Flip-Flop 206 forming the synchronizer for synchronizing the ALL_IDLE signal. However, to provide a suitably fast logic resolve time, the D-type Flip-Flop 206 may be replaced with a faster logic device, e.g., a fast-settled-down device, based on the particular application of the glitchless clock switch.

Based on the principles of the present invention, a generic, glitchless clock switch design is presented which may be used to switch between any number of clock sources without complicated circuitry, synchronization between clock sources, or other disadvantageous properties of conventional clock switches.

While the invention has been described with reference to the exemplary embodiments thereof, those skilled in the art will be able to make various modifications to the described embodiments of the invention without departing from the true spirit and scope of the invention.

APPENDIX A

```
--file : KSWITCHn.vhd
library IEEE, DEFAULT;
use IEEE.std_logic_1164.all;
use DEFAULT.pkg_klock.all;
entity KSWITCHn is
generic (
    N
);
port (
    CLK         : in std_logic_vector(0 to N-1);
    RESET       : in std_logic;
    --SEL1, 2, 3, . . . , None mutual exclusive
    SEL         : in std_logic_vector(0 to N-1);
    SELNONE     : in std_logic;
    CLKOUT      : out std_logic;
    CKON        : out sdd_logic_vector(0 to N-1);
    CKOFF       : out std_logic_vector(0 to N-1);
    ALLOFF      : out std_logic
);
end KSWITCHn;
architecture RTL of KSWITCHn is
    component KstateFF_s
    port (
        RESET       : in std_logic;
        CLK         : in std_logic;
        SEL         : in std_logic;
        ON_Ready    : in std_logic;
        STATE       : inout STATE_TYPE
    );
    end component;
    component KstateFF_r port(
        RESET       : in std_logic;
        CLK         : in std_logic;
        SEL         : in std_logic;
        ON_Ready    : in std_logic;
        STATE       : inout STATE_TYPE
    );
    end component;
    type STATE_TYPE_ARRAY is array (0 to N-1) of STATE_TYPE;
    signal STATE: STATE_TYPE_ARRAY;
    signal clka, all_idle, all_idle_sync : std_logic;
begin
    State_0: KstateFF_s port map(
        RESET       => RESET,
        CLK         => CLK (0),
        SEL         => SEL (0),
        ON_Ready    => all_idle_sync,
        STATE       => STATE (0)
    );
    State_Gen : for k in 1 to N-1 generate
        Staten_k : KstateFF_r port map(
            RESET       => RESET,
            CLK         => CLK (0),
            SEL         => SEL (0),
            ON_Ready    => all_idle_sync,
            STATE       => STATE (k)
        );
    end generate State_Gen;
```

APPENDIX A-continued

```
Controls:process(STATE,SEL,CLK,SELNONE)
    variable vCKON, cCKOFF : std_logic_vector(0 to
        N-1_);
    variable vCLKOUT,vIDLE : std_logic;
begin
    vCLKOUT := '0';
    vIDLE := '1';
    Loop_Con: for k in 0 to N-1 loop
        if (STATE (k) =ONN) then
            vCKON(k) := '1';
            vCKOFF(k) :='0';
        elseif(STATE(k) =STOP) then
            vCKON(k) :='0';
            vCKOFF(k) :='0';
        else vCKON(k) :='0';
            vCKOFF(k) :='1';
        end if;
        CKON(k) <= cCKON(k);
        CKOFF(k) <= vCKOFF(k);
        vCLKOUT := vCLKOUT or (CLK(k) and
            vCKON(k));
        vIDLE:= vIDLE and vCKOFF(k);
    end loop;
    CLKOUT <= vCLKOUT;
    all_idle <= vIDLE;
    ALLOFF <= vIDLE and SELNONE;
end process;
XSYN : block
begin
    CLKA_GEN : process(SEL,CLK)
        variable vclka : std_logic;
    begin
        vclka := '0';
        Loop_clka : for k in 0 to N-1 loop
            vclka := vclka or (CLK(k) and
                SEL(k));
        end loop Loop_clka;
        clka <= vclka;
    end process;
    SYNC: process(RESET,all_idle,clka)
    begin
        if(RESET='1') then
            all_idle_sync <= '0';
        elseif(clka'event and clka='0') then
            all_idle_sync <= all_idle;
        end if;
    end process;
end block XSYN;
end RTL;
```

APPENDIX B

```
--file : KstateFF_r.vhd
library IEEE, DEFAULT;
use IEEE.std_logic_1164.all;
use DEFAULT.pkg _klock.all;
entity KstateFF_r is
port(
    RESET       : in std_logic;
    CLK         : in std_logic;
    SEL         : in std_logic;
    ON_Ready    : in std_logic;
    STATE       : out STATE_TYPE
);
end KstateFF_r;
architecture RTL of KstateFF_r is
    signal tSTATE : STATE_TYPE;
begin
    process(RESET,CLK,SEL,ON_ready,tSTATE)
    begin
        if(RESET='1') then
            tSTATE <=IDLE;
        elseif(CLK'event and CLK='0') then
            case tSTATE is
                when ONN =>
                    if(SEL='0') then
```

APPENDIX B-continued

```
                        tSTATE<=STOP;
                    endif;
                when STOP =>
                    tSTATE<=IDLE;
                when IDLE =>
                    if(SEL='1'andON_Ready='1')
                        then tSTATE <=ONN;
                    end if;
            end case;
        end if;
    end process;
    STATE <= tSTATE;
end RTL;
```

APPENDIX C

```
--file : KstateFF_s.vhd
library IEEE, DEFAULT;
use IEEE.std_logic_1164.all;
use DEFAULT.pkg_klock.all;
entity KstateFF_s is
port(
    RESET       : in std_logic;
    CLK         : in std_logic;
    SEL         : in std_logic;
    ON_Ready    : in std_logic;
    STATE:      : out STATE_TYPE
);
end KstateFF_s;
architecture RTL of KstateFF_s is
    signal tSTATE : STATE_TYPE;
begin
    process(RESET,CLK,SEL,ON_ready,tSTATE)
    begin
        if(RESET='1') then
            tSTATE<=ONN;
        elseif(CLK'event and CLK='0') then
            case tSTATE is
                when ONN =>
                    if(SEL='0') then
                        tSTATE<=STOP;
                    end if:
                when STOP =>
                    tSTATE<=IDLE;
                when IDLE =>
                    if(SEL='1' and ON_Ready='1')
                        then tSTATE <=ONN;
                    end if;
            end case;
        end if;
    end process;
    STATE <= tSTATE;
end RTL;
```

APPENDIX D

```
--file : pkg_klock.vhd
package pkg_klock is
    type STATE_TYPE is (ONN,STOP,IDLE);
end pkg_klock;
```

What is claimed is:

1. A glitchless clock switch, comprising:

a plurality of clock signals each having a finite state machine including an on state, a stop state, and an idle state of operation;

logic, in communication with each finite state machine, to detect when all of said plurality of clock signals are simultaneously in one of said on state, said stop state, or said idle state of operations and if so to activate a corresponding all-idle signal; and logic to synchronize said all-idle signal with a transition of said glitchless clock switch to output a newly selected one of said plurality of clock signals.

2. The glitchless clock switch according to claim 1, wherein:
said simultaneous one of said on state, said stop state, or said idle state is said idle state.

3. The glitchless clock switch according to claim 1, wherein:
each state machine transitions in an order from said on state, to said stop state, to said idle state.

4. The glitchless clock switch according to claim 1, wherein:
each state machine transitions to a next state of operation based on a control signal derived from a respective one of said clock signals irrespective of which one of said plurality of clock signals is currently being output by said glitchless clock switch.

5. A method of switching between a plurality of clock signals, comprising:
transitioning each of said plurality of clock signals into a respective IDLE state;
selecting one of said plurality of clock signals for output;
synchronizing said respective IDLE states of each of said plurality of clock signals to said selected one of said plurality of clock signals; and
outputting said selected one of said plurality of clock signals once said respective IDLE states of each of said plurality of clock signals are synchronized by said step of synchronizing.

6. The method of switching between a plurality of clock signals according to claim 5, further comprising:
selecting another one of said plurality of clock signals;
transitioning said selected one of said plurality of clock signals into its respective IDLE state;
again synchronizing said respective IDLE states of all of said plurality of clock signals to said another one of said plurality of clock signals; and
outputting said another one of said plurality of clock signals once said respective IDLE states of all of said plurality of clock signals are synchronized by said step of again synchronizing.

7. A finite state machine for at least one clock signal controlled by a glitchless clock switch, comprising:
an on state to indicate a selection of said at least one clock signal;
a stop state to indicate a transition of said at least one clock signal from said on state; and
an idle state to indicate a non-selection of said at least one clock signal.

8. The finite state machine for at least one clock signal controlled by a glitchless clock switch according to claim 7, wherein:
said finite state machine operates on a clock edge of a clock signal being switched.

9. The finite state machine for at least one clock signal controlled by a glitchless clock switch according to claim 7, wherein:
a separate on state, stop state, and idle state is established for each of a plurality of clock signals being switched by said glitchless clock switch.

10. The finite state machine for at least one clock signal controlled by a glitchless clock switch according to claim 7, wherein:
said finite state machine operates in a direction from said on state to said stop state, from said stop state to said idle state, and from said idle state to said on state.

\* \* \* \* \*